United States Patent [19]

Kato

[11] 3,949,505

[45] Apr. 13, 1976

[54] QUICKLY INTERCHANGEABLE SLIDE MOUNTS

[76] Inventor: Bunichi Kato, 9-25, Osu 1-chome, Naka, Nagoya, Japan

[22] Filed: Jan. 4, 1974

[21] Appl. No.: 430,785

[52] U.S. Cl. ................................................. 40/152
[51] Int. Cl.² ............................................ G09F 1/12
[58] Field of Search ....................... 40/152, 158, 10

[56] References Cited
UNITED STATES PATENTS

| | | | |
|---|---|---|---|
| 2,362,434 | 11/1944 | Fitch et al. | 40/156 X |
| 2,528,366 | 10/1950 | Houston | 40/156 X |
| 3,069,794 | 12/1962 | Lieberman | 40/152 |
| 3,150,457 | 9/1964 | Thieme | 40/152 |
| 3,713,238 | 1/1973 | Hyman | 40/158 |

Primary Examiner—Louis G. Mancene
Assistant Examiner—Wenceslao J. Contreras
Attorney, Agent, or Firm—Basile and Weintraub

[57] ABSTRACT

A slide mount comprising a main frame and a separate fitting frame which is easily separable from the main frame to quickly mount a transparency or demount it for changing to another one. The main frame has a concavity for receiving a transparency and the fitting frame adapted to be removably inserted into the concavity to fit the transparency against the main frame. In the center of its concavity, the main frame has an opening which is substantially of the same size as the picture on the transparency and is so positioned as to become aligned with the picture upon insertion of the transparency into the concavity. Likewise, the fitting frame has in its center an opening which is substantially of the same size as the opening in the main frame and alignable therewith upon insertion of the fitting frame into the concavity of the main frame. The concavity in the main frame is substantially of the same size as a transparency, so that when the transparency is placed in the concavity and the fitting frame is applied against the transparency, the picture becomes correctly aligned with the openings in the main and fitting frames for accurate projection through those openings.

2 Claims, 7 Drawing Figures

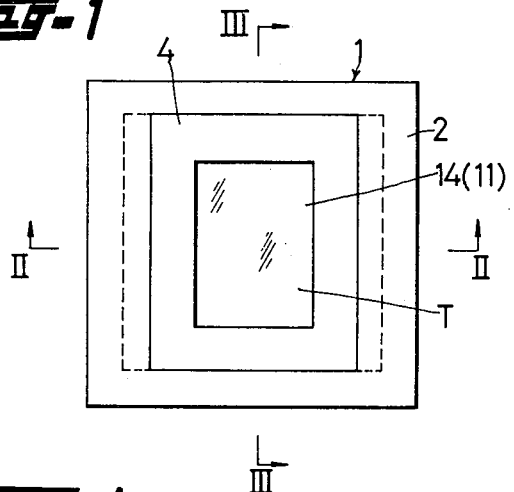
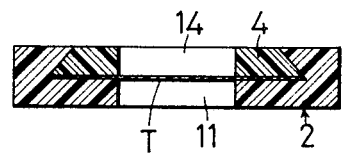
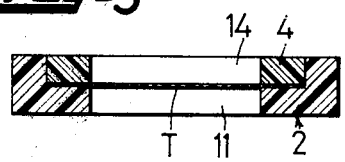
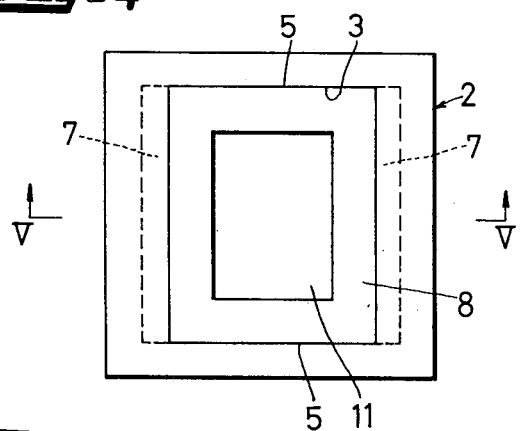
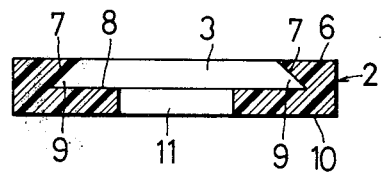
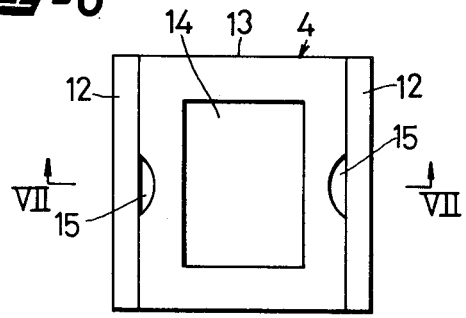
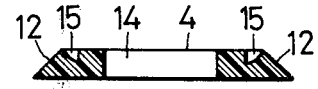

QUICKLY INTERCHANGEABLE SLIDE MOUNTS

BACKGROUND OF THE INVENTION

This invention relates to a slide mount for holding a transparency in position for projection in a projector.

A typical slide mount known in the art is formed from a rectangular sheet of cardboard or other stiff material foldable along the shorter sides thereof into two equal half portions. Each of the half portions of the sheet is formed in the center thereof with a rectangular opening which is identical in dimensions to a picture on a transparency to be mounted on the sheet, and when the two half portions of the sheet are folded upon each other, the openings formed therein are capable of being aligned with each other. In order to prepare a slide, a transparency is placed on one half portion of the sheet in such a manner that the picture on the transparency may be exactly aligned with the opening formed in the one half portion; an adhesive is applied to the sheet in an area around the transparency; then, the other half portion of the sheet is folded upon the transparency and joined by the adhesive with the one half portion thereof to secure the transparency in position. Due to its general character as described above, however, the known slide mount unavoidably involves a number of disadvantages in the manufacture and use thereof. First, a great amount of care, and hence a high level of skill are required to position a transparency relative to the openings of the mount to correctly expose the picture on the transparency through those openings. Thus, positioning a transparency correctly in a know slide mount necessarily makes the production of a slide a very time-consuming and inefficient job. Moreover, a transparency often becomes stained by the fingers of a person during its positioning relative to the openings of the mount. It is also possible that the adhesive applied to the mount may often stain or even spoil the transparency. Furthermore, the known slide mount provides no interchangeability, because when it is desired to take a particular transparency out of its mount, there is no alternative but to destroy the mount, and destroying the mount makes it unreusable and may often give damage to the transparency.

SUMMARY OF THE INVENTION

It is, therefore, an object of this invention to provide an improved slide mount wherein none of the disadvantages of the known device as pointed out above is present. According to this invention, there is provided a slide mount comprising an outer or main frame formed from a sheet of plastic or light alloy or any other appropriate molded material and a separate inner or fitting frame which may be made of the same material as the main frame, and which is adapted to fit a transparency against the main frame. The fitting frame is separable from the main frame to fit a transparency into the main frame or take it out therefrom. The main frame may be of a square or rectangular planar shape having a rectangular concavity on one side thereof which is adapted to receive a transparency and the fitting frame to be applied against the transparency. The main frame has a rectangular opening in the center of its concavity and this opening is substantially of the same size as the picture on a transparency to be projected on to a screen. Likewise, the fitting frame has a flat planar shape and is formed with a rectangular opening in the center thereof. The opening in the fitting frame is substantially of the same size as the opening in the main frame, so that when the fitting frame is applied to the main frame to hold a transparency therebetween, the two openings may become exactly aligned with each other to permit projection of a full picture on to a screen when the slide is placed in an operable projector. When the fitting frame is inserted into the concavity of the main frame to hold a transparency therein, the exposed surface of the fitting frame is flush with an adjacent surface of the main frame or more preferably even slightly therebelow to ensure an undisturbed feed of the slide in and out of a projector.

The concavity in the main frame is so dimensioned that when a transparency is inserted into the concavity, the transparency may remain virtually immovable in the concavity. Since the openings in the main frame and the fitting frame are so positioned as to become aligned with each other and also to become aligned with the picture on a transparency when the transparency is placed in the concavity of the main frame and the fitting frame is applied against the transparency, accurate positioning of the transparency may be achieved in an instant. This salient feature of this invention ensures drastic reduction in the time required for production of a slide and enables production of a great many slides in a very short time. Moreover, as the fitting frame can easily be separated from the main frame, the slide mount of this invention allows for a quick interchange of transparencies whenever desired. Furthermore, since the fitting frame is so designed as to be held by the main frame without the aid of any adhesive, there is no possibility of a transparency being stained or spoiled by an adhesive.

BRIEF DESCRIPTION OF THE DRAWINGS

FIG. 1 is a top plan view of a preferred form of the slide mount according to this invention shown with a transparency placed therein;

FIG. 2 is a sectional view taken along line II—II of FIG. 1;

FIG. 3 is a sectional view taken along line III—III of FIG. 1;

FIG. 4 is a top plan view of a main frame employed in the slide mount of this invention;

FIG. 5 is a sectional view taken along line V—V of FIG. 4;

FIG. 6 is a top plan view of a fitting frame employed in the slide mount of this invention; and FIG. 7 is a sectional view taken along line VII—VII of FIG. 6.

DESCRIPTION OF THE PREFERRED EMBODIMENTS

A slide mount generally shown at 1 in FIG. 1 comprises an outer or main frame 2 and an inner or fitting frame 4 which is a separate structure from the main frame 2. The main frame 2 may be formed from a relatively thin sheet of plastics or light alloy or any other appropriate molded material. The fitting frame 4 may be made of the same material as the main frame 2. The main frame 2 is formed with a rectangular concavity 3 on one side thereof as shown in FIGS. 4 and 5 to receive a transparency T and the fitting frame 4 to be applied against the transparency T. The main frame 2 has a square or rectangular upper peripheral surface 6 defining the concavity 3 and the opposite side from the upper surface 6 defines a bottom surface 10, as illustrated in FIG. 5. The concavity 3 is defined by two pairs of opposite walls 5,5 and 7,7 as shown in FIG. 4. The two walls 5,5 are perpendicular to the upper surfce 6 of the main frame 2 and the other two walls 7,7 are inclined outwardly in such a manner that the concavity 3 may have the largest cross-sectional area at its bottom 8 to define a pair of opposite wedge-like corners 9,9 between the bottom 8 of the concavity 3 and the upper surface 6 of the main frame 2. The main frame 2 is formed in the center thereof with a rectangular opening 11 communicating between the bottom 8 of the concavity 3 and the bottom surface 10 of the main frame 2 and having substantially the same size and contour as the picture on a transparency. At its bottom 8, the concavity 3 is substantially of the same size as a transparency, and the opening 11 is so positioned relative to the bottom 8 of the concavity 3 that when a transparency T is received in the concavity 3, the picture on the transparency T may become aligned with the opening 11.

The fitting frame 4 may be formed from a thin sheet of elastic material, such as plastics or a light alloy, and preferably has a thickness substantially equal to or even slightly smaller than the depth of the concavity 3 in the main frame 2 to ensure that the fitting frame 4 may not interfere with any part of a projector. The fitting frame 4 is adapted to be received in the concavity 3 of the main frame 2 and in order to ensure that the fitting frame 4 may not unintentionally disengage itself from the concavity 3, the fitting frame 4 has a pair of opposite outwardly inclined walls 12,12 which are substantially complementary to the inclined walls 7,7 of the concavity 3 and are adapted to be received in the corner portions 9,9 of the concavity 3. The other pair of walls 13,13 of the fitting frame 4 are perpendicular to the top or bottom surface of the fitting frame 4 and are adapted to be brought into contact with the perpendicular walls 5,5 of the concavity 3 in the main frame 2. The fitting frame 4 is formed in the center thereof with a rectangular opening 14 of the same size as the opening 11 in the main frame 2. The opening 14 in the fitting frame 4 is so positioned as to become aligned with the opening 11 in the main frame 2 so that the openings 11 and 14 and the picture on a transparency may become aligned with one another on a complete slide ready for projection. Because of its elastic nature, the fitting frame 4 may easily be bent to the extent necessary for insertion or removal through the inlet of the concavity 3 in the main frame 2 which is smaller than the bottom of the fitting frame 4. A pair of substantially semi-circular recesses 15,15 are provided on the fitting frame 4 adjacent to the top of the inclined walls 12,12 thereof as best shown in FIG. 7 to facilitate removal of the fitting frame 4 from the main frame 2. The tips of a thumb and a forefinger, for example, may be engaged with the recesses 15,15 to detach the fitting frame 4 from the main frame 2 for removing the transparency T or any other purpose.

In the preparation of a slide using the slide mount 1 of this invention, a transparency T is slipped into the concavity 3 of the main frame 2 and placed on the bottom 8 of the concavity 3. Since the bottom 8 of the concavity 3 is substantially of the same size as the transparency T, the transparency T is correctly positioned in the main frame 2 with the picture on the transparency T aligned with the opening 11 in the main frame 2 in an instant once it is slipped into the concavity 3. The fitting frame 4 is held by the recesses 15,15 and bent to the extent necessary for insertion through the inlet of the concavity 3. Upon insertion through the inlet of the concavity 3, the fitting frame 4 is released, whereupon the fitting frame 4 restores its original flat shape due to its elastic nature and is correctly positioned in the concavity 3 to hold the transparency T against the main frame 2. Once the fitting frame 4 is fitted in the concavity 3, the inclined walls 7,7 of the concavity 3 cooperate with the inclined walls 12,12 of the fitting frame 4 to prevent any unintentional removal of the fitting frame 4 from the main frame 2. Thus, a slide may be produced without requiring any elaborate work or any adhesive as has hitherto been required.

When it is desired to take out the transparency T from the slide mount 1, this can easily be accomplished by engaging fingers in the recesses 15,15 of the fitting frame 4 and pulling it out of the concavity 3, whereupon the transparency T can easily be taken out of the concavity 3 without being subjected to any stress that might cause damage to the transparency T. Thus, a single slide mount may be successfully used for a great many different transparencies interchangeably depending upon any particular projection requirements.

Although the invention has been described with reference to a preferred form, it is to be understood that modifications or variations may be made by those skilled in the art without departing from the scope of the invention which is defined by the appended claims.

I claim:

1. A slide mount for framing a transparency into a slide, said transparency carrying a picture thereon for projection in a projector, said slide mount comprising:

a planar main frame having an upper surface, a lower surface, and two pairs of opposite side walls;

a concavity formed in said upper surface of said main frame in the center thereof and adapted to stationarily receive said transparency therein, said concavity having a bottom spaced below said upper surface of said main frame and being substantially equal in size to the transparency, said concavity being defined by a pair of spaced-apart, opposite walls extending substantially perpendicular to said upper surface and a pair of spaced-apart, opposite walls angularly inclined with respect to said upper surface, said walls defining an inlet into said concavity having a smaller cross-sectional area than said bottom thereof;

a first opening formed in the center of said concavity and communicating between said bottom of said concavity and said lower surface of said main frame, said first opening being substantially of the same size as said picture and located in such a position that upon insertion of said transparency into said concavity said picture may be correctly aligned with said first opening;

a flexible planar fitting frame having an upper surface, a lower surface, and two pairs of opposite side walls, one of said pairs of side walls being equally angularly inclined as the angularly inclined side walls of the main frame to engage same, the other pair of side walls being substantially perpendicular to the upper surface of said fitting frame and adapted to be removably inserted into said concavity to hold said transparency against said bottom of said concavity, said fitting frame including means formed on the upper surface thereof to facilitate removal from said concavity;

a second opening formed in the center of said fitting frame and communicating between said upper and lower surfaces of said fitting frame, said second opening being substantially of the same size as said first opening and alignable with said opening upon insertion of said fitting frame into said concavity; and said means for facilitating removal comprising a pair of recesses formed in said upper surface of said fitting frame opposite to each other, each of said recesses being located adjacent to the top of one of said pairs of opposite side walls of said fitting frame, the recesses being located adjacent the top of said angularly inclined opposite side walls of said fitting frame.

2. The invention as defined in claim 1 wherein said upper surface of said fitting frame is flush with said upper surface of said main frame when said transparency and said fitting frame are received in said concavity.

* * * * *